Sept. 30, 1941.   C. C. OEHLER   2,257,244
OIL AND WATER SEPARATOR
Filed April 6, 1939
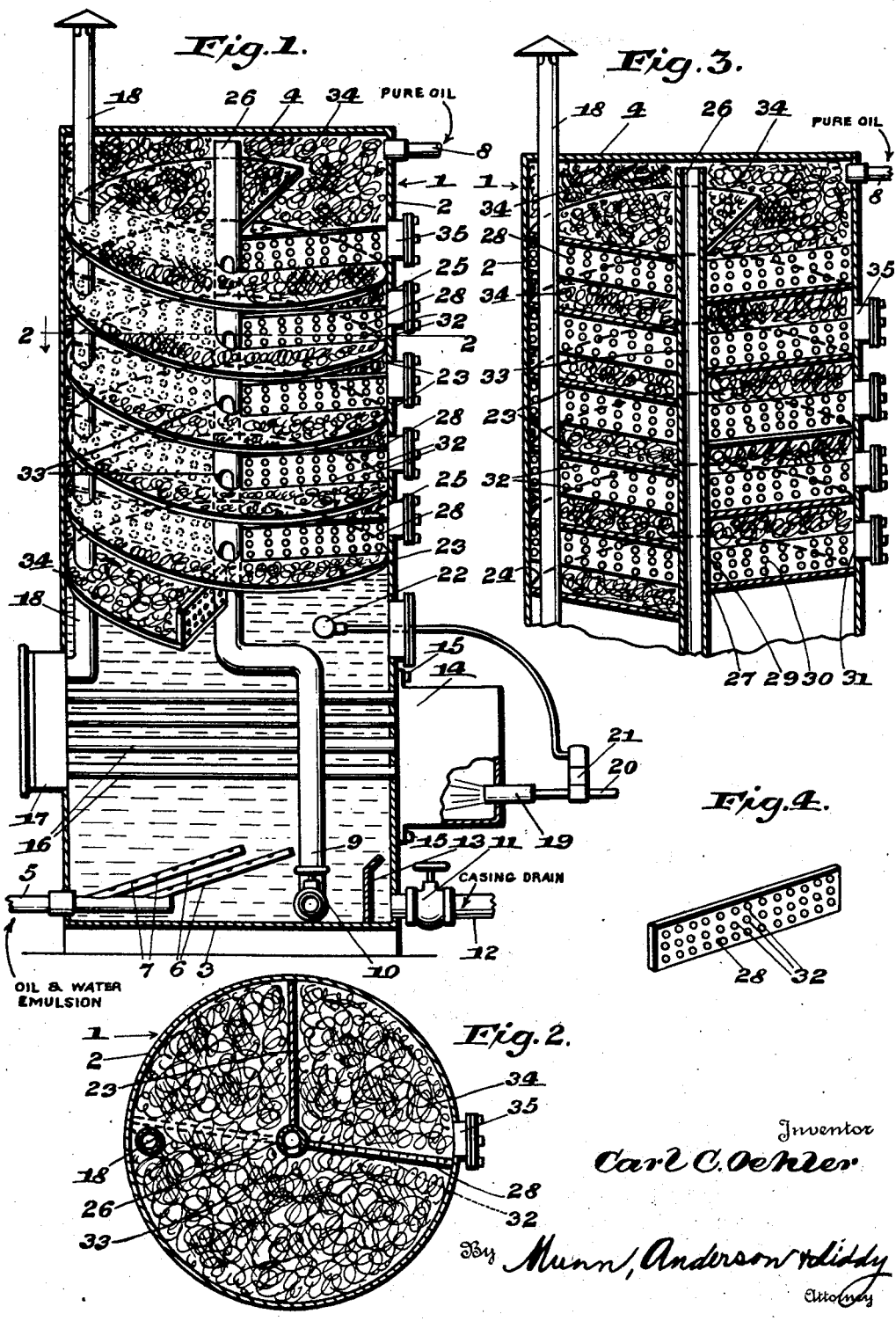
Inventor
Carl C. Oehler
By Munn, Anderson & Liddy
Attorney Patented Sept. 30, 1941

2,257,244

UNITED STATES PATENT OFFICE 2,257,244

OIL AND WATER SEPARATOR

Carl C. Oehler, Kilgore, Tex.

Application April 6, 1939, Serial No. 266,442

6 Claims. (Cl. 210—47)

This invention relates to improvements in liquid separating apparatus, a particular purpose thereof being to separate water from oil when an oil well begins to produce emulsified liquid. An occurrence such as this happens quite often when an oil well begins ceasing production. Of course this is not always the case, but in the event of its happening it becomes obvious that the product does not have the same market value as does the pure oil.

The water seeps in from surrounding strata, mixing with the oil and producing an emulsion. Such emulsified oil is necessarily treated in order to remove the water, but the current means for providing the treatment have been found inadequate from the standpoint of ease and speed of operation and of general efficiency.

It has been found that by conducting the emulsified liquid through a sufficiently long channel wherein the liquid could be subjected to such action as will induce a separation of its constituents, the method of separation is capable of being carried on in a continuous manner and will produce a clear division of the water from the oil so that the latter is caused to flow off in a condition as pure as delivered from any well not contaminated with water. With this preamble in mind the objects of the invention are as follows:

First, to provide a separator primarily adapted to use in oil fields for the purpose of separating water from emulsified oil so that the oil can be delivered to the pipe line in the desired unadulterated condition.

Second, to provide a separator which is primarily based on an upward helical flow of the liquid through a porous substance, the water being collected at and drained from the core of the helix allowing the oil to pass upward in an increasingly purified condition.

Third, to provide a separator wherein the emulsified liquid is circulated contrary to gravity through a helical or equivalent devious channel, said channel containing a porous substance serving to retard the liquid and assist in the separation of its commingled constituents.

Fourth, to provide a separator wherein the helical partition which forms the bottom and top of the helical channel, is dished toward the axis whence the heavier constituent (such as water) of the liquid gravitates for separation from the lighter constituent (such as oil).

Other objects and advantages will appear in the following specification, reference being had to the accompanying drawing, in which:

Figure 1 is a central vertical section of the complete separator, the helical partition being shown in perspective.

Figure 2 is a cross section taken on the line 2—2 of Fig. 1.

Figure 3 is a fractional sectional view of the separator particularly illustrating the dished shape of the partition.

Figure 4 is a detail perspective view of one of the spreaders.

In carrying out the invention the separator, generally designated 1, is made to comprise a casing 2 which includes the bottom 3 and top 4. It will thus be understood that the casing is a closed one, the necessary exceptions comprising certain openings which provide access to the interior. These openings provide for the admission of the following parts:

An inlet conduit 5 provides for the admission of the emulsified liquid to the casing 2 at a point near the bottom 3. This conduit terminates in a spreader 6 on the inside of the casing, this consisting of one or more pipes branching off from the conduit and provided with a large number of perforations 7.

The liquid thus delivered is made to flow upward through the casing 2 contrary to gravity. The treatment which it undergoes separates the water from the oil, the latter being discharged from a conduit 8 connected to the casing near the top 1. The water is drained into a pipe 9 which, at a point exteriorly of the casing, has a gate or other desired valve 10. In the event of its becoming necessary to drain the casing 2, preparatory to the making of repairs or inspections, a valve 11 in a casing drain pipe 12 is opened, said pipe being connected to a low point of the casing. A baffle 13 is situated in spaced relationship but in front of the entrance to the drain pipe 12.

A fire-box 14 is mounted on the casing 2 adjacent to the bottom 3. This fire-box is secured at 15 in any desired way. Said fire-box has communication with a plurality of fire tubes 16 which span the distance across the interior of the casing, said tubes being in communication with a smoke box 17. The smoke box is secured to the casing on the side opposite to that to which the fire box 14 is secured, said smoke box having a stack 18 tightly connected to it. The stack passes upwards in the casing and has a discharge opening above the top 4. A burner 19 of any desired type provides for the combustion of oil or gas within the fire box 14. The feed pipe 20 of this burner has a thermostatically controlled valve 21 of some known kind, the thermostatic element of said valve being under the control of a pyrometer 22 situated within the casing 2. The tubes 16 are heated because of the flame contained thereby during the operation of the burner 19. The emulsified liquid flows around these tubes and also becomes heated. This heating materially increases the fluidity of the liquid so that it is subjected to a separating action much more readily than if it were conducted through cold.

The separating structure comprises a helical partition 23. This is usually made of metal and it consists of metallic plates riveted or welded together at the joints so as to comprise a solid floor or partition, in other words a succession of helices connected end to end. This partition, as its name implies, is arranged in helical form, resulting in the helical channel herein enlarged upon. Its outer edges are welded at 24 to the interior of the casing. The resulting space 25 comprises a helical channel, the primary purpose and advantage of which is to form a devious path for the liquid so that the latter is retained in the casing 2, for a comparatively long time.

A standpipe 26 constitutes the core of the separator. It also constitutes the core of the helical partition 23 inasmuch as it is situated in the axial center of the latter. The helical partition is built around the standpipe, its inner edges being welded to the standpipe at 27. In welding the partition 23 at 24 and 27 the former is dished inwardly toward the standpipe 26. The dishing is clearly shown in Fig. 3, and its purpose is to encourage the gravitation of the water toward the standpipe during the process of separation.

Separation partly occurs through centrifugal action. This is induced in part by the helical course which the liquid is compelled to take in flowing from the inlet 5 to the outlet 8. But a more decided centrifugal action is produced by a system of spreaders 28. These are nothing more than metal plates which are set radially (Fig. 2) in the channel 25, being welded at three edges to the standpipe partition and casing as designated at 29, 30, and 31. Some of the spreaders are secured to the partition so as to be upstanding in the channel, and others are secured so as to be depending. The result is a staggered arrangement in which the passages over the free edges of the spreaders are alternately above and below the spreaders.

This welding fixes the spreaders. They are of less height than the channel 25. The liquid is thus enabled to flow over the spreaders, and in order to avoid a too pronounced retardation each spreader is amply perforated at 32 to let the liquid flow through. But when the liquid encounters a spreader it is naturally deflected outwardly. This augments the centrifugal action and since the oil is lighter than the water the latter not only tends to stay near the standpipe 26, but it is also induced to flow in that direction because of the dishing of the partition 23.

Openings 33 are provided in the standpipe 26 in fairly large numbers. There is at least one opening in each of the convolutions of the helical channel 25. The previously mentioned water enters the standpipe at these openings. The standpipe is tightly coupled to the pipe 9, and the separated water flows into the latter and away to a point of disposal.

A further retarding and separating action is imposed upon the liquid by filling the helical channel 25 with a loose, porous substance 34. This substance conveniently comprises excelsior. This is easy to get and is cheap to replace. Any equivalent substance can be used in its stead. The spreaders 28 serve the additional function of preventing a mass movement of the substance 34 upward in the helical channel. The spreaders act as periodic stays or keys for the substance 34 which, because of its looseness, would tend to shift upward with the liquid were it not for the anchoring action of the spreaders.

A series of manholes 35 is arranged along the casing 2. These open into the convolutions of the channel 25. The covers of these manholes are usually bolted down, but in such a manner that the covers are readily taken off in the event it becomes necessary to have access to the interior of the channel.

The operation is readily understood. The general principle has been explained already, but a brief review may be to advantage. Emulsified oil is introduced into the casing 2 at the bottom by way of the conduit 5, whence it flows upward in the casing being compelled to take a helical course through the channel 25 before it reaches the outlet 8. The liquid is heated on its way to the helical channel and this facilitates the separating action.

The upward force under which the liquid is driven and the helical course which it is compelled to take causes a centrifugal action thereupon, this being augmented by the partial obstructions which the spreaders 28 afford. The oil being of a less specific gravity than the water of the emulsion tends to collect to the outside, whereas the water, being heaviest, tends to collect at the core.

The loose porous substance 34 slows the flow of the liquid so that there can be a more pronounced separation of the water from the oil. The latter is discharged in a relatively pure state at the conduit 8, whereas the unwanted water is discharged into the pipe 9. It is desired to state that the helical partition 23 can be either right or left handed. That is to say, it can be made on the principle of an auger in either a right or left hand direction. In either event it will provide for the longest possible distance of travel of the liquid before the latter leaves the top terminal of the helical channel.

I claim:

1. A separator comprising a casing, an inlet at one end of the casing for the introduction of emulsified liquid comprising heavy and light constituents, a partition consisting of a succession of stationary helices connected end to end in a portion of the casing defining a helical channel, means coupled directly to the casing at the other end for conducting away the lighter constituents, a standpipe constituting the core of the helical partition having longitudinally spaced openings communicating with the channel for the inflow therefrom of the heavier constituents, said standpipe having an outlet, and a porous substance situated in said channel to retard the flow of liquid and assist in the separating action.

2. A separator comprising a casing, an inlet at one end of the casing for the introduction of emulsified liquid comprising heavy and light constituents, a helical partition consisting of a succession of helices connected end to end in a portion of the casing defining a helical channel, means coupled directly to the casing at the other end for conducting away the lighter constituents, a standpipe constituting the core of the helical partition having longitudinally spaced openings communicating with the channel for the inflow therefrom of the heavier constituents, said standpipe having an outlet, a porous substance situated in said channel to retard the flow of liquid and assist in the separating action, and perforated spreaders situated in the channel, being in upright positions therein and of less height than the respective convolutions of the channel, further retarding the flow of liquid and serving to keep the porous material in place.

3. A separator comprising an upright casing having a liquid inlet and a liquid outlet at the respective bottom and top end, a helical partition consisting of a succession of stationary helices connected end to end and marginally secured to the casing in a zone intermediately of the position of said inlet and said outlet to define a helical channel for the helical flow of the liquid, and a standpipe situated axially of the partition and constituting a hollow core for the channel, said partition being marginally secured to the standpipe and being dished in the direction of the standpipe to assist in the gravitation of one of the liquid constituents, said standpipe having longitudinally spaced openings in the convolutions of the channel for the inflow therefrom of said liquid constituent, said standpipe having an outlet.

4. A separator comprising an upright casing having an inlet and an outlet at the respective bottom and top thereof, said bottom inlet being for the introduction of a liquid comprising heavy and light constituents, a stationary helical partition in the casing obstructing the upward flow of the liquid against gravity and defining a helical channel for the upflow of the liquid, and means constituting the core of the partition and channel, having longitudinally spaced openings to continuously receive the heavier constituent while the lighter constituent discharges at said outlet, said standpipe also having an outlet.

5. A separator comprising a casing having a liquid inlet and a liquid outlet at the respective bottom and top ends, a helical partition fixed in the casing to lengthen the course of the liquid and to provide a helical channel therefor, a tubular core for the partition, said core having a vertical succession of inlets providing communication of the core with said channel adjacent to some of the spreaders, said core having an outlet for the substance admitted thereat, and spreaders in the channel to retard the liquid flow, some of the spreaders being secured to the partition to be upstanding in the channel and others secured to the partition to be depending therefrom, said spreaders being in staggered relationship and being of less height than the respective convolution of the channel, thereby to provide passages over the edges of the spreaders, said passages being alternately over and under the respective upstanding and depending spreaders.

6. A separator comprising a casing, an inlet at one end of the casing for the introduction of emulsified liquid comprising heavy and light constituents, an axial standpipe, a partition full breadth of the casing from the standpipe to the inner wall of said casing, consisting of a succession of stationary helices connected end to end in a portion of the casing defining a helical channel, and means coupled directly to the casing at the other end thereof for conducting away the lighter constituents, said standpipe constituting the core of the helical partition and having longitudinally spaced openings communicating with the channel for the inflow therefrom of the heavier constituents, said standpipe having an outlet.

CARL C. OEHLER.